(12) United States Patent  
Balestra et al.

(10) Patent No.: US 11,257,287 B2
(45) Date of Patent: Feb. 22, 2022

(54) SYSTEM, DEVICE AND METHOD FOR CREATING THREE-DIMENSIONAL MODELS

(71) Applicant: INVRSION S.R.L., Milan (IT)

(72) Inventors: Simone Balestra, Comacchio (IT); Fabrizio Dini, Milan (IT); Matteo Esposito, Seveso (IT)

(73) Assignee: INVRSION S.R.L., Milan (IT)

( * ) Notice: Subject to any disclaimer, the term of this patent is extended or adjusted under 35 U.S.C. 154(b) by 0 days.

(21) Appl. No.: 16/331,798

(22) PCT Filed: Aug. 29, 2017

(86) PCT No.: PCT/EP2017/071657
§ 371 (c)(1),
(2) Date: Mar. 8, 2019

(87) PCT Pub. No.: WO2018/046352
PCT Pub. Date: Mar. 15, 2018

(65) Prior Publication Data
US 2019/0362541 A1 Nov. 28, 2019

(30) Foreign Application Priority Data
Sep. 12, 2016 (IT) .......... 102016000091510

(51) Int. Cl.
G06T 17/00 (2006.01)
G06T 7/55 (2017.01)
(Continued)

(52) U.S. Cl.
CPC ............ *G06T 17/00* (2013.01); *G06F 16/532* (2019.01); *G06T 7/55* (2017.01); *G06T 7/97* (2017.01);
(Continued)

(58) Field of Classification Search
CPC ....................................................... G06T 17/00
(Continued)

(56) References Cited

U.S. PATENT DOCUMENTS

2003/0021453 A1* 1/2003 Weise ............... H02K 3/24
382/128
2003/0231175 A1* 12/2003 Pfister ............... G06T 15/205
345/419

(Continued)

FOREIGN PATENT DOCUMENTS

WO 0161650 A1 8/2001

OTHER PUBLICATIONS

International Search Report dated Dec. 21, 2017 re: Application No. PCT/EP2017/071657, pp. 1-5, citing: US 2017/024896 A1, US 2008/112610 A1, US 2003/231175 A1 and WO 01/61650 A1.

(Continued)

*Primary Examiner* — Shivang I Patel
(74) *Attorney, Agent, or Firm* — Scully, Scott, Murphy & Presser, P.C.

(57) ABSTRACT

A system for creating three-dimensional models includes a processing device operated by a user, having a control unit, a storage unit for storing photographic images, and a storage unit for storing 3D models. The system further includes a device for acquiring photographic images of a reference solid object. The processing device and the acquisition device are mutually connected and in communication. The processing device is configured to create a 3D model that corresponds to the reference solid object based on the photographic images of the reference solid object, which are acquired by the acquisition device and saved in the photographic image storage unit.

4 Claims, 6 Drawing Sheets

(51) Int. Cl.
  *G06T 7/00*    (2017.01)
  *G06F 16/532*  (2019.01)
  *G06T 15/04*   (2011.01)
  *H04N 5/225*   (2006.01)
  *H04N 5/247*   (2006.01)

(52) U.S. Cl.
  CPC ............ *G06T 15/04* (2013.01); *H04N 5/2256* (2013.01); *H04N 5/247* (2013.01); *G06T 2200/08* (2013.01); *G06T 2207/20132* (2013.01)

(58) Field of Classification Search
  USPC ........................................................ 345/420
  See application file for complete search history.

(56) References Cited

U.S. PATENT DOCUMENTS

| | | | |
|---|---|---|---|
| 2008/0021882 A1* | 1/2008 | Pu | G06F 16/583 |
| 2008/0112610 A1 | 5/2008 | Israelsen et al. | |
| 2013/0156329 A1* | 6/2013 | Szeliski | G06K 9/00214 |
| | | | 382/218 |
| 2017/0024896 A1* | 1/2017 | Houghton | H04N 13/243 |

OTHER PUBLICATIONS

Written Opinion dated Dec. 21, 2017 re: Application No. PCT/EP2017/071657, pp. 1-8, citing: US 2008/112610 A1, US 2003/231175 A1 and WO 01/61650 A1.

\* cited by examiner ic>
SYSTEM, DEVICE AND METHOD FOR CREATING THREE-DIMENSIONAL MODELS

TECHNICAL FIELD

The present disclosure relates to a system and a method for creating three-dimensional models, which are particularly, although not exclusively, useful and practical for the automatic scanning of real solid objects and the subsequent creation of corresponding three-dimensional models ("3D" for short) for use in real-time, three-dimensional graphical videogaming applications, where the term "videogaming applications" means interactive entertainment software, of which a typical example is videogames for consoles, for computers or for mobile devices (smartphones, tablet computers and so on).

BACKGROUND

Three-dimensional models or 3D are sets of digital data, i.e. computer databases, that contain the necessary data to virtually represent solid objects of the real world by way of 3D modeling software applications (such as for example Maya, 3ds Max, MODO, SketchUp, and so on) or other types of 3D graphics software applications (videogames, simulations and so on).

Typically, a 3D model is represented on a screen using triangles, or more generally polygons, which are mutually joined so as to form a virtual solid object that is more faithful to the corresponding reference real solid object, which was modeled previously. The set of such polygons is called a "polygonal mesh", or more simply "mesh".

The polygons are defined by three-dimensional spatial coordinates (x, y, z), two-dimensional mapping coordinates for the texture (a texture image used to cover the external surface of a virtual solid object), and material characteristics that define its graphical rendering (roughness, opacity, transparency, and so on). The set of points defined by the spatial coordinates (x, y, z) is called a "point cloud". All the above mentioned data are then entered in the 3D model, which is saved as a file on adapted storage means.

Currently, 3D models can be obtained manually by expert graphics technicians using 3D modeling software applications; alternatively, the 3D models can be obtained semi-automatically by way of suitable scanners or laser pens, which detect the spatial position, or by using software applications for point interpolation starting from sequences of photographs.

However, these conventional solutions for creating 3D models are not devoid of drawbacks, among which is the fact that the manual methods, despite the use of expert graphics technicians, have the disadvantage of requiring a lot of time in order to obtain a 3D model that is faithful to the reference real solid object.

The semi-automatic methods that use scanners or laser pens, or the methods that use software applications for point interpolation, have the disadvantage that they create point clouds that are very dense, and not suitable for use in software applications that render the models in real time. For this reason, semi-automatic methods require an additional manual intervention for cleanup, i.e. reducing the number of points, and to correct artifacts (errors in an image) which are due to inaccuracies of the scanning or of the interpolation; further it is necessary to manually map the texture.

Note that the above-mentioned drawbacks become more significant the more real solid objects there are to be modeled, since the associated modeling operations translate to increasingly long times and increasingly high costs.

SUMMARY

The aim of the present disclosure is to overcome the limitations of the known art described above, by devising a system and a method for creating three-dimensional models that make it possible to obtain levels of productivity that are superior to those that can be obtained with conventional solutions and/or levels of productivity that are similar but at lower cost.

Within this aim, the present disclosure conceives a system and a method for creating three-dimensional models that make it possible to reduce to the minimum the times and costs sustained in order to obtain one or more 3D models.

The present disclosure also provides a system and a method for creating three-dimensional models that make it possible to create 3D models that are suitable for rendering in real time, while retaining a high graphical quality and a high level of detail.

The present disclosure further provides a system and a method for creating three-dimensional models that make it possible to create 3D models that are already cleaned up and reduced in terms of number of points, and are therefore suitable for rendering in real time.

The present disclosure devises a system and a method for creating three-dimensional models that make it possible to create 3D models in which artifacts have already been corrected, and are therefore suitable for rendering m real time.

The present disclosure also provides a system and a method for creating three-dimensional models that are highly reliable, easily and practically implemented, and low cost if compared to the known art.

This aim and these and other advantages which will become better apparent hereinafter are achieved by providing a system for creating three-dimensional models, which comprises a processing device operated by a user, comprising a control unit, storage means for storing photographic images, and storage means for storing 3D models, characterized in that it comprises a device for acquiring photographic images of a reference solid object, said processing device and said acquisition device being mutually connected and in communication, and in that said processing device is configured to create a 3D model that corresponds to said reference solid object based on said photographic images of said reference solid object, which are acquired by said acquisition device and saved in said photographic image storage means.

The aim and objects are also achieved by a device for acquiring photographic images, characterized in that it comprises:

a light-proof container body provided with an opening that can be closed and within which a reference solid object is to be positioned, which comprises a fixed base provided with a hole, and with a transparent plate at said hole;

an upper still camera adapted to take photographs from above of said reference solid object, a lateral still camera adapted to take photographs around said reference solid object, and a lower still camera adapted to take photographs from below said reference solid object; and a first light source and a second light source.

The aim and objects are also achieved by a method for creating three-dimensional models which comprises the steps of acquiring photographic images of a reference solid object by way of a photographic image acquisition device;

transmitting said photographic images of said reference solid object from said acquisition device to a processing device;

searching in a library for a preexisting 3D model that is similar to said reference solid object within a similarity sensitivity threshold, based on said photographic images of said reference solid object, by way of said processing device;

creating a 3D model that corresponds to said reference solid object by adaptation, using said preexisting 3D model as an initial 3D model, by way of said processing device;

saving said 3D model that corresponds to said reference solid object in said library, by way of said processing device.

BRIEF DESCRIPTION OF THE DRAWINGS

Further characteristics and advantages of the disclosure will become better apparent from the detailed description of a preferred, but not exclusive, embodiment of the system and of the method for creating three-dimensional models according to the disclosure, which is illustrated by way of non-limiting example with the aid of the accompanying drawings, wherein.

DETAILED DESCRIPTION OF THE DRAWINGS

Figure 1:
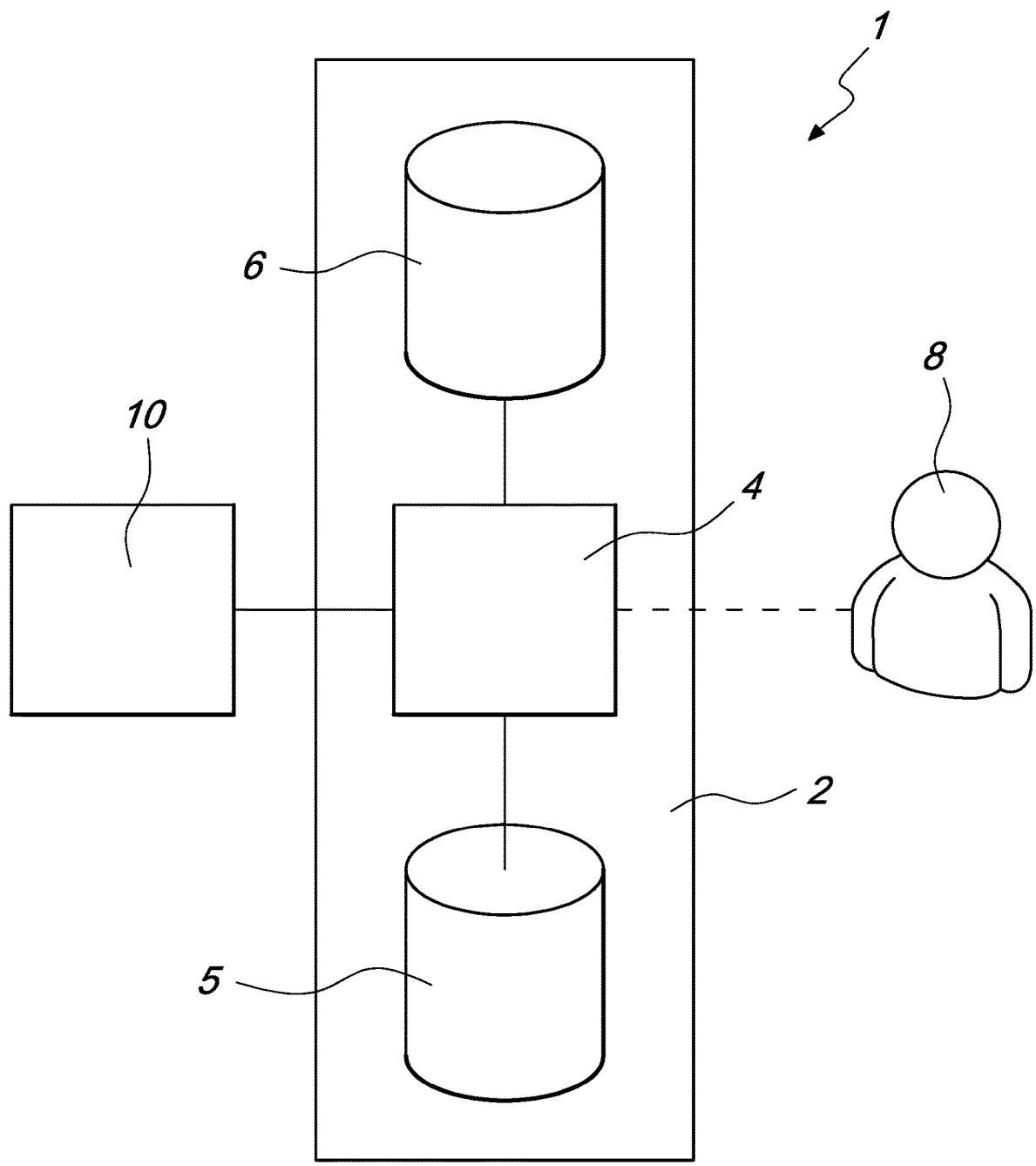
FIG. 1 is a schematic block diagram of an embodiment of the system for creating three-dimensional models, according to the present disclosure.
Figure 2:
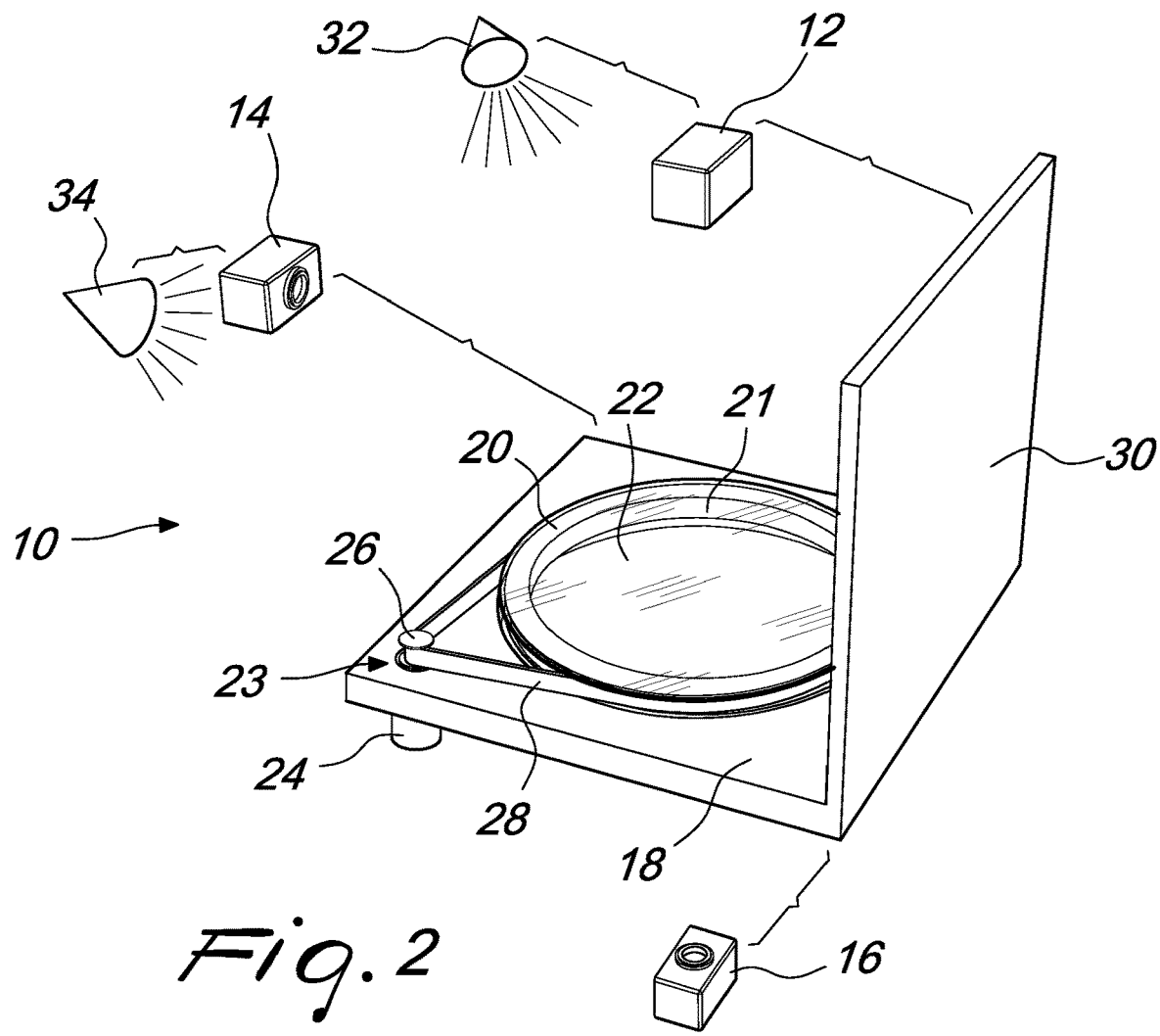
FIG. 2 is a partial and simplified perspective view of an embodiment of the photographic image acquisition device of a system for creating three-dimensional models, according to the present disclosure.
Figure 3:
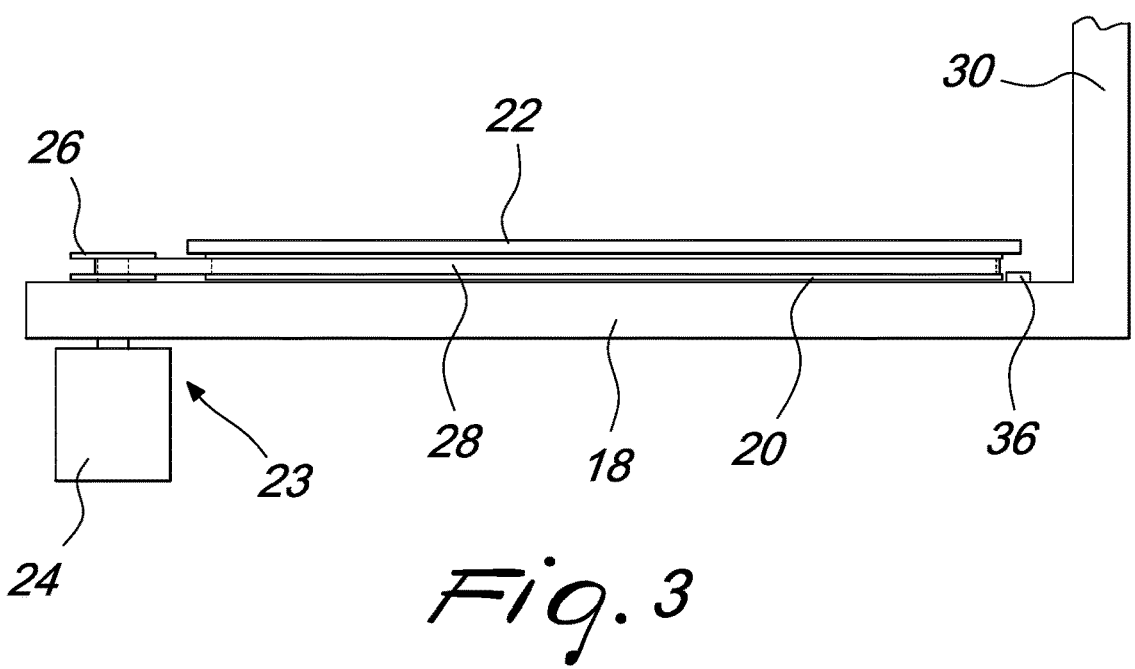
FIG. 3 is a side view of the embodiment of the photographic image acquisition device of a system for creating three-dimensional models shown in FIG. 2, according to the present disclosure.
Figure 4:
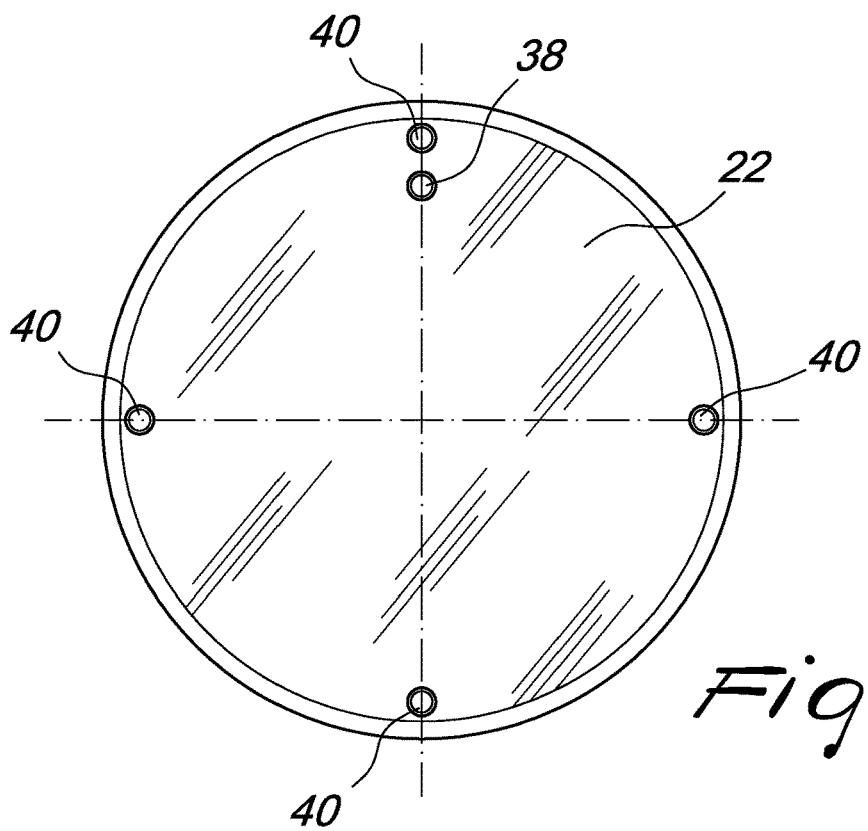
FIG. 4 is a view from above of the transparent rotating plate of an embodiment of the photographic image acquisition device of a system for creating three-dimensional models, according to the present disclosure.
Figure 5:
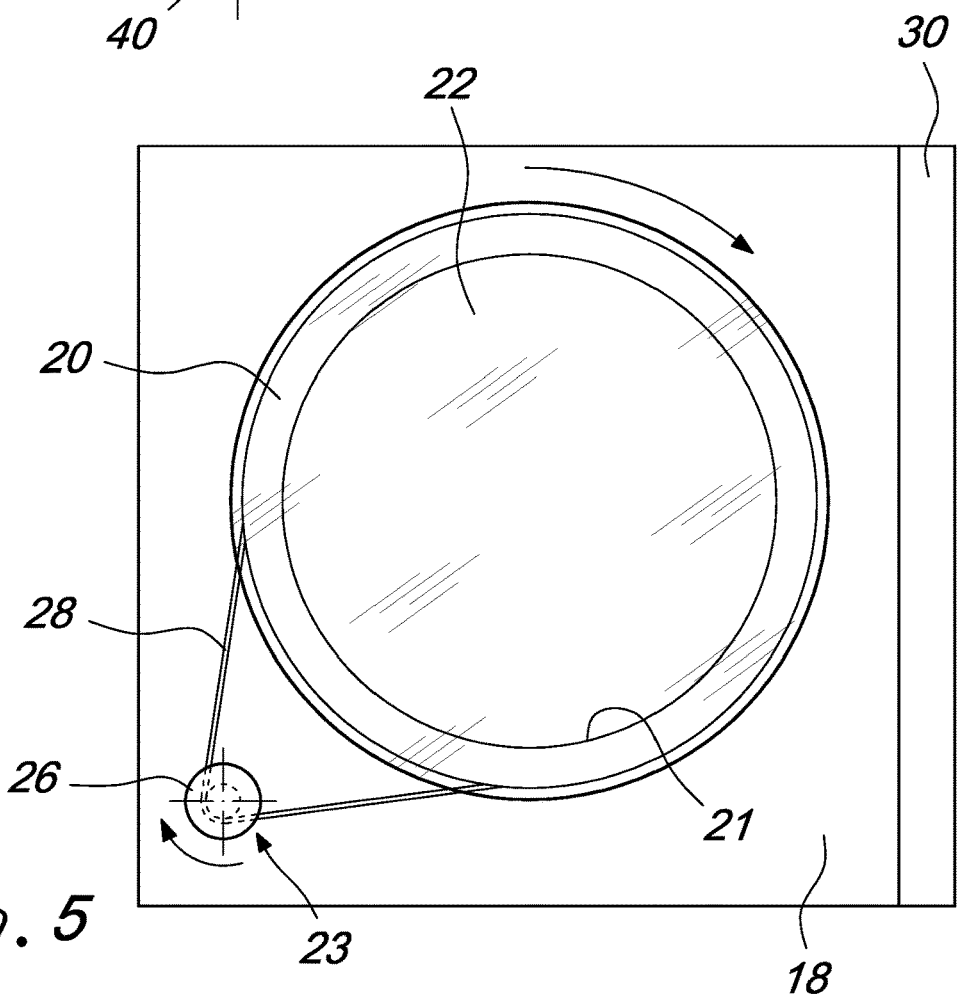
FIG. 5 is a view from above of the embodiment of the photographic image acquisition device of a system for creating three-dimensional models shown in FIG. 2, according to the present disclosure.
Figure 6:
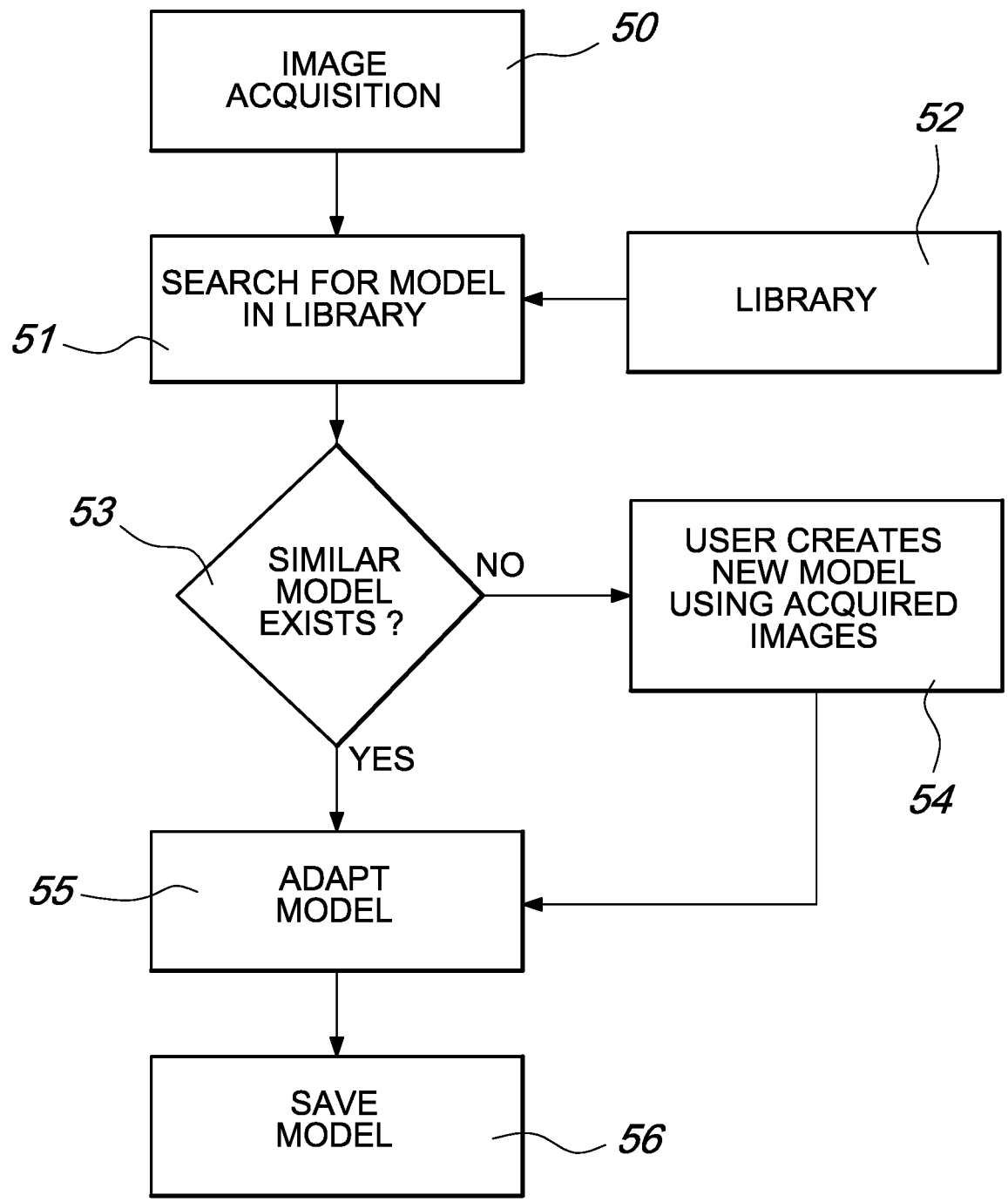
FIG. 6 is a flowchart illustrating an embodiment of the method for creating three-dimensional models, according to the present disclosure.
Figure 7:
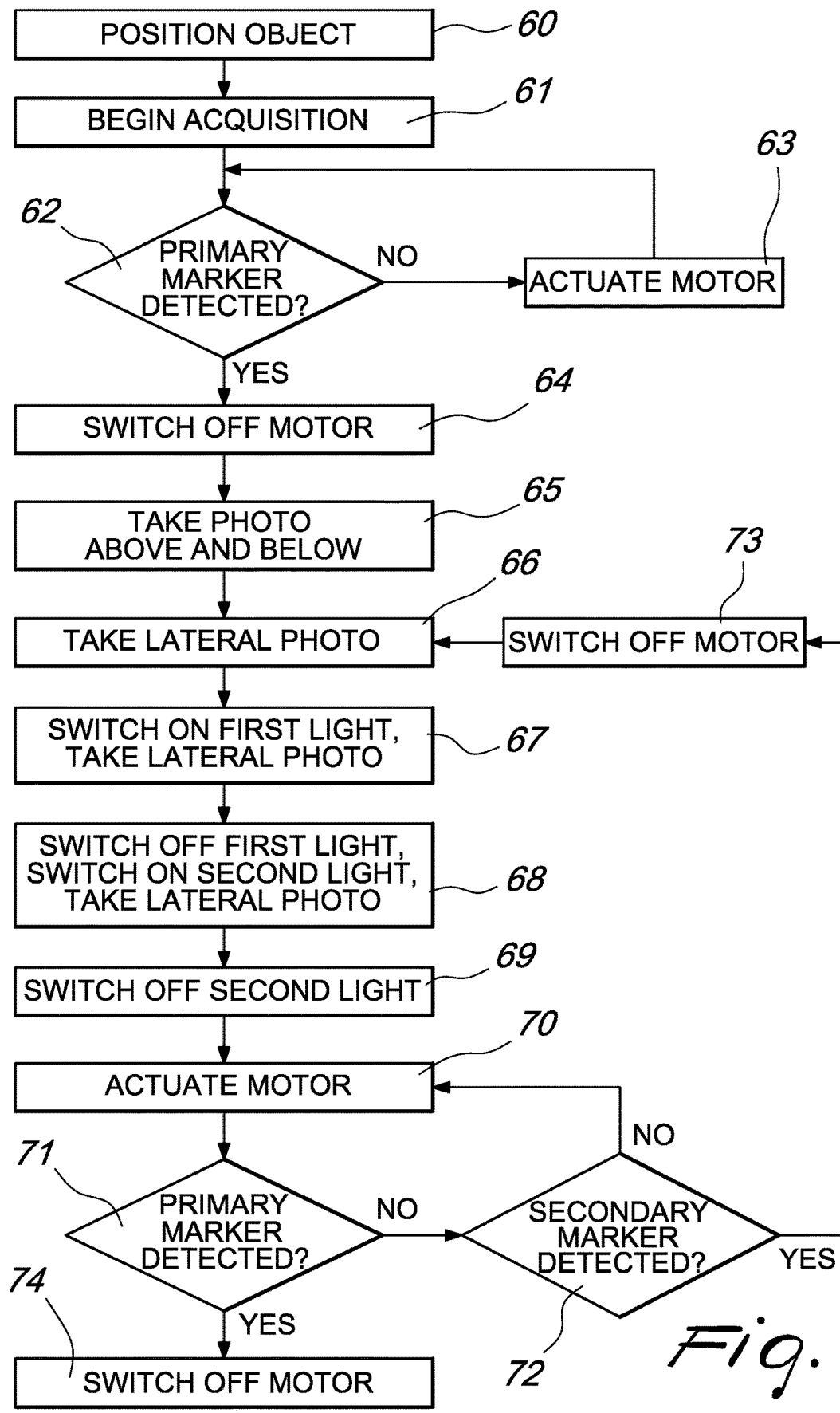
FIG. 7 is a flowchart illustrating in detail the step of acquiring photographic images of a reference solid object to be modeled, of an embodiment of the method for creating three-dimensional models, according to the present disclosure.
Figure 8:
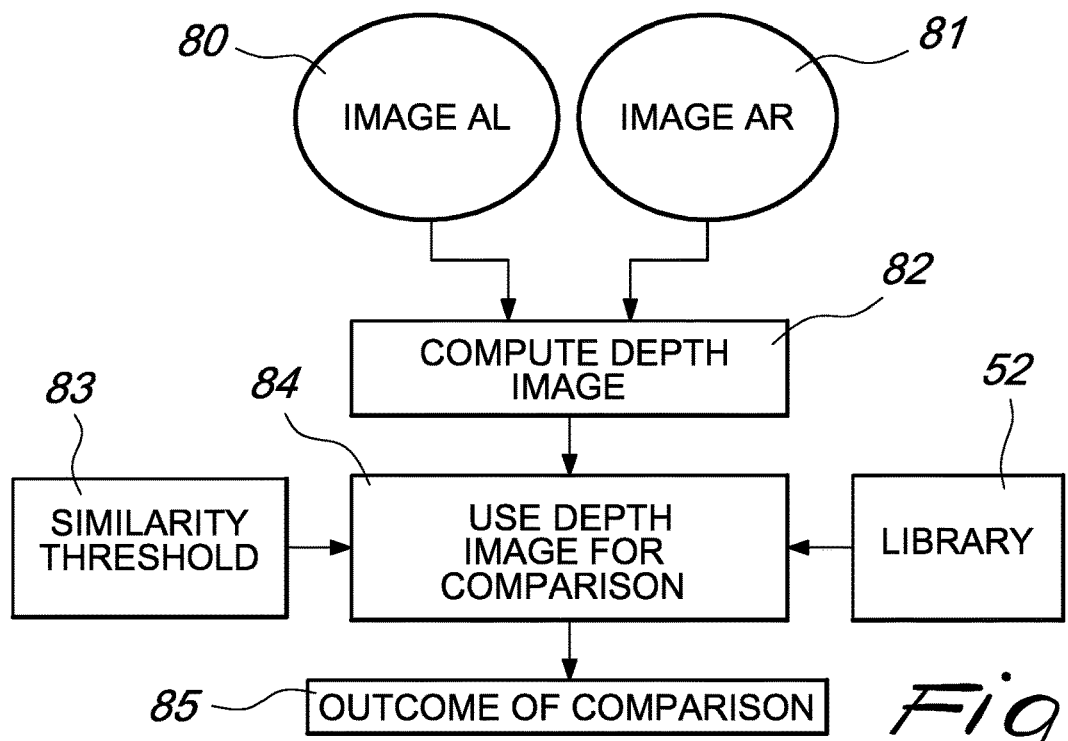
FIG. 8 is a flowchart illustrating in detail the step of searching for a preexisting 3D model similar to the reference solid object to be modeled, and the subsequent step of verifying the outcome of such search, of an embodiment of the method for creating three-dimensional models, according to the present disclosure.

With reference to FIGS. 1-9, the system for creating three-dimensional models according to the disclosure, generally designated by the reference numeral 1, comprises substantially a processing device 2 operated by a user 8, and a device 10 for acquiring photographic images of a reference solid object; the processing device 2 and the acquisition device 10 are mutually connected and in communication.

In the present disclosure, the acquisition of photographic images of a reference solid object, which are subsequently used for the creation of a 3D model corresponding to the reference real solid object, occurs automatically by way of the device 10, which is electronically controlled by a control unit (not shown) which is conveniently configured.

The photographic image acquisition device 10, in particular the corresponding control unit, is configured to automatically control and execute the sequence of shots, the exposure times and the aperture of the diaphragms of the still cameras, the rotation of the reference solid object, the switching on and off of the lights, and the sending or transmission of the acquired photographic images to the processing device 2.

With reference to this last point, the photographic image acquisition device 10 comprises means of connection and communication (not shown) with the processing device 2, for example by way of a telematic communications network, wired or wireless, or by way of a USB cable connection.

The photographic image acquisition device 10 comprises a container body (shown only partially) provided with a re-closeable opening, within which the reference solid object to be modeled is to be positioned; obviously, the reference solid object must have dimensions that are compatible with the capacity of the container. The device 10, in particular the corresponding container, can clearly be made on a larger or smaller scale as a function of the larger or smaller size of the reference objects to be modeled.

The reference solid object to be modeled, once placed in the container and once the opening of the latter is closed, must be isolated from all direct and indirect external light sources, in order not to negatively influence the graphical quality of the corresponding photographic images acquired, and so obtain optimal results in the subsequent creation of a 3D model corresponding to the reference solid object. Preferably, the device 10 is used in a room that is substantially dark or low-lit.

Therefore the container of the device 10 is light-tight, that is to say, it is made suitably and with adapted materials so as to prevent any infiltration of light inside (a form of "camera oscura" in miniature).

The container body of the device 10, which as mentioned is shown only partially, comprises a fixed base or lower plane 18, which has a hole 21, preferably circular in shape.

At the hole 21, in particular along or proximate to its circumference, i.e. to its edge, the base 18 comprises hollow rotation means 20, which comprise for example an axial ball bearing, and a transparent plate 22, which is made for example of glass or polymethylmethacrylate (abbreviated to PMMA) and is preferably circular in shape.

The hollow rotation means 20 are adapted to support the transparent plate 22 and to enable the rotation of the latter about an axis that passes through its center. The transparent rotating plate 22 is adapted to support the reference solid object to be modeled, the latter therefore being positioned on it.

The transparent rotating plate 22 is associated directly with the hollow rotation means 20 and indirectly with the base 18. The hollow rotation means 20 are associated directly both with the base 18 and with the transparent rotating plate 22. Preferably, the hole 21, the hollow rotation means 20 and the transparent rotating plate 22 have substantially similar diameters.

Advantageously, the transparent rotating plate 22 comprises a primary marker 38, positioned along or proximate to the circumference, i.e. the outer rim, of the transparent rotating plate 22. The primary marker 38 acts as a reference element to identify the beginning of the rotation stroke of the transparent rotating plate 22 in the process of acquiring photographic images of the reference solid object.

Advantageously, the transparent rotating plate 22 comprises a plurality of secondary markers 40, preferably four in number, which are arranged along or proximate to the circumference, i.e. the outer rim, of the transparent rotating plate 22.

The secondary markers 40 are adapted to subdivide the transparent rotating plate 22 into four sections. The subdivision of the transparent rotating plate 22 serves to define the exact angular positions of the reference solid object to be modeled.

Both the primary marker 38 and the secondary markers 40 mentioned above are small in size and are detected by an optical or magnetic sensor 36 which is comprised in the base 18 of the container body.

Advantageously, the photographic image acquisition device 10 comprises motor means 23 which are associated with the base 18 and adapted to actuate rotationally the transparent rotating plate 22, which can rotate about its own central axis by virtue of the hollow rotation means 20.

The motor means 23 can comprise an electric motor 24 adapted to actuate rotationally a rotation shaft 26 that, by way of a belt 28, transmits the rotation to the hollow rotation means 20 and consequently to the transparent rotating plate 22.

The photographic image acquisition device 10 comprises an upper still camera 12 adapted to take photographs from above the reference solid object to be modeled, a lateral still camera 14 adapted to take photographs around the reference solid object to be modeled, and a lower still camera 16 adapted to take photographs from below the reference solid object to be modeled. The still cameras 12, 14 and 16 are associated with the container body of the device 10, the container body therefore acting as a rest and a support for the still cameras 12, 14 and 16. The still cameras 12, 14 and 16 are preferably digital.

The hole 21 of the base 18 and the transparent rotating plate 22 enable the lower still camera 16 to photograph the lower face of the reference solid object to be modeled, by virtue of the transparency of the rotating plate 22.

The container body of the device 10 advantageously comprises a neutral side wall 30, preferably white in color and opaque, opposite from the lateral still camera 14, which makes it possible to have a neutral background in the photographs taken by the lateral still camera 14 of the reference solid object, thus avoiding light reflections.

In a preferred embodiment of the disclosure, the lateral still camera 14 is stereoscopic, i.e. with a double optical sensor, so as to acquire an in-depth photographic image of the reference solid object to be modeled, which is useful to improve recognition of the object and the subsequent adaptation of the corresponding 3D model.

In an alternative embodiment of the disclosure, in place of a stereoscopic front still camera, two traditional front still cameras can be arranged side by side. In such case, in addition to the lower costs to be sustained compared to a stereoscopic still camera, it is possible to have greater control of the lenses of the front still cameras, as such lenses have great importance for the quality of the acquired photographic images.

The still cameras 12, 14 and 16 are preferably digital still cameras with a full-frame 36-millimeter optical sensor, which comprise a lens with focal length comprised between 40 and 50 millimeters, so that the image is not too distorted by the lens.

The still cameras 12, 14 and 16 are arranged at a sufficient distance to frame the entire reference solid object to be modeled; this distance is directly proportional to the maximum size of the largest reference solid object that is to be modeled and is directly proportional to the focal length of the lens; for example, for reference objects with a diameter of 50 centimeters and a 50-millimeter lens, the optimal distance between the still cameras 12, 14 and 16 and the reference solid object is in the neighborhood of 50 centimeters.

The still cameras 12, 14 and 16 can comprise a polarizing filter adapted to reduce the light reflections on the outer surface of the reference solid object to be modeled.

The photographic image acquisition device 10 comprises a first light source 32 and a second light source 34, which are preferably arranged on the same wall on which the lateral still camera 14 is positioned (for example the first on the right and the second on the left), both adapted to emit a direct light toward the reference solid object to be modeled, but from separate positions (and therefore along separate directions and with separate angles). The light sources 32 and 34 are associated with the container body of the device 10, the container body therefore acting as a rest and a support for the light sources 32 and 34. For example, the first and second light sources 32 and 34 can comprise respectively a first spotlight and a second spotlight.

The acquisition of photographic images of the reference solid object occurs by making the reference solid object rotate about a vertical axis, substantially corresponding to its own central vertical axis; as mentioned previously, the rotation of the reference solid object is obtained by way of the motor means 23 which are adapted to actuate rotationally the transparent rotating plate 22 on which the reference solid object is positioned.

As mentioned previously, it is fundamentally important that the transparent rotating plate 22, in particular its central portion, is not obstructed, because the reference solid object rests on it and it is necessary to photograph it from below with the lower still camera 16 in order to model it; it is for this reason that the rotation of the transparent rotating plate 22 occurs by virtue of the hollow rotation means 5, which comprise for example an axial ball bearing.

In an embodiment of the disclosure, during the acquisition of photographic images, a single shot is taken of the reference solid object by the upper and lower still cameras 12 and 16, while three shots are taken with different lighting for each angular position of the reference solid object by the lateral still camera 14.

In an embodiment of the disclosure, during the acquisition of photographic images, for each angular position of the reference solid object three shots are taken with different lighting by each one of the three still cameras 12, 14 and 16, for a total of nine shots for each angular position of the reference solid object.

The first shot is taken with a very weak, diffused light, emitted by the light sources 32 and 34, which makes it possible to obtain the albedo images, where the term "albedo" means the ratio of light globally diffused in all directions by a surface to light received by it (also known as the diffuse reflection coefficient or factor). To compensate for the low intensity of light, in this first shot it is necessary to use longer exposure times and sufficiently wide apertures.

The second shot and the third shot are then made with two direct, intense white lights originating from different directions and with different angles, i.e. a first light emitted by the first light source 32 and a second light emitted by the second light source 34, which make it possible to obtain two images with out-of-phase reflections from which then to obtain the normal map, by way of the technique of normal mapping that is commonly used to simulate the complexity of the relief of surfaces without having to model them in detail.

The processing device 2 of the system 1 for creating three-dimensional models according to the disclosure is a server device, constituted for example by a computer desktop, which comprises a control unit 4, storage means 5 for digitally storing photographic images, and storage means 6 for digitally storing 3D models.

The processing device 2 further comprises user interface means (not shown), by way of which the user 8 interacts in input and in output with the processing device 2, which comprise for example a screen, a keypad and a mouse.

The processing device 2 further comprises means of connection and communication (not shown) with the photographic image acquisition device 10, for example by way of a telematic communications network, wired or wireless, or by way of a USB cable connection.

The control unit 4 is the main functional element of the processing device 2, and for this reason it is connected and in communication with the other operating and/or functional elements that are comprised in remote processing device 2.

The control unit 4 is provided with suitable capacity for processing and for interfacing with the other elements of the processing device 2, and it is configured to command, manage and coordinate the operation of the elements of the processing device 2 with which it is connected and in communication.

The control unit 4 is configured to execute the processing operations on the data originating from the other elements of the processing device 2 and, especially, from the photographic image acquisition device 10, returning in each instance the corresponding results, i.e. the 3D models corresponding to the reference solid objects.

The processing device 2, and in particular the associated control unit 4, is therefore configured to create a 3D model that corresponds to a reference real solid object based on a set of photographic images of the reference solid object to be modeled, which are acquired by the acquisition device 10.

The storage means 5 are adapted to store all the acquired photographic images and, more generally, all the data originating from the photographic image acquisition device 10, and therefore referable to all the reference solid objects to be modeled, transmitted by the acquisition device 10 to the processing device 2.

The storage means 6 are adapted to store all the 3D models and, more generally, all the data (hereinafter also referred to as [a] "library" with reference to the method) generated by the operations to model reference solid objects, such modeling operations as mentioned being executed in particular by the control unit 4.

In a preferred embodiment of the system 1 for creating three-dimensional models according to the disclosure, the storage means 5 and 6 comprise a database stored on conveniently dimensioned memory media.

In an embodiment of the system 1 for creating three-dimensional models according to the disclosure, the storage means 5 and 6 can be external to the processing device 2; in this case, the processing device 2 further comprises means of interfacing with the storage means 5 and 6.

With reference to the figures, operation of the system 1 for creating three-dimensional models according to the disclosure, or an embodiment of the method for creating three-dimensional models according to the disclosure, is described below. The method can be divided into two separate steps, which can be carried out separately from each other in time.

The first step comprises the step 50 of acquiring photographic images of a reference solid object to be modeled, such acquisition being carried out by way of the photographic image acquisition device 10 described above.

During the acquisition step 50, the reference solid object is positioned by the user 8 in the acquisition device 10, in particular in the corresponding container and on the corresponding transparent rotating plate 22, which automatically takes a set of photographic shots from all angles (sides, above, below) and with different lighting necessary to determine the material from which the reference solid object is made.

The photographic images thus acquired are then transmitted by the acquisition device 10 to the processing device 2, which in particular saves them in the corresponding storage means 5 of acquired photographic images.

The second phase begins in step 51, in which the processing device 2, in particular the corresponding control unit 4, based on the photographic images of the reference solid object to be modeled, searches in the library 52, i.e. in the storage means 6 of 3D models, a preexisting 3D model that is similar to the reference solid object.

If in step 53 the outcome of the search is positive, and therefore a 3D model is found that is similar to the reference solid object to be modeled, within a similarity sensitivity threshold preferably set by the user 8, the processing device 2, in particular the corresponding control unit 4, uses the preexisting 3D model present in the library 52 as an initial 3D model, and in step 55 it creates a new 3D model corresponding to the reference solid object by way of adaptation of the preexisting one.

If in step 53 the outcome of the search is negative, and therefore no 3D model is found that is similar to the reference solid object to be modeled, within a similarity sensitivity threshold preferably set by the user 8, in step 54 the user 8 manually creates, by way of the user interface means of the processing device 2, a new 3D model based on the photographic images of the reference solid object to be modeled, and this 3D model created by the user 8 is then adapted in step 55.

Finally, in step 56 the new 3D model corresponding to the reference solid object to be modeled is saved by the processing device 2, in particular by the corresponding control unit 4, in the library 52, i.e. in the storage means 6 of 3D models, both to be used by the user 8 and also optionally to be used by the system 1 as a preexisting 3D model in future modeling operations.

The preexisting 3D models in the library 52 are created by the user 8 or by expert graphics technicians using 3D modeling software applications, as mentioned based on the photographic images of the reference solid object to be modeled which were acquired by the acquisition device 10.

In detail, the step 50 of acquiring photographic images of a reference solid object to be modeled comprises the following substeps.

Initially in step 60 the user 8 positions the reference solid object in the acquisition device 10, in particular in the corresponding container and on the corresponding transparent rotating plate 22, positioning it at the center of the transparent rotating plate 22 and aligning it with the primary marker 38 of the transparent rotating plate 22.

In step 61 the process is begun of acquiring photographic images, and in step 62 it is checked if the primary marker 38 of the transparent rotating plate 22 is detected by the sensor 36, and therefore aligned with it.

If the primary marker 38 is not detected by, and therefore aligned with, the sensor 36, in step 63 the motor means 23 of the acquisition device 10, which are adapted to rotate the transparent rotating plate 22, are actuated until alignment is achieved. When the sensor 36 detects the primary marker 38, and therefore their alignment, in step 64 the motor means 23 are switched off.

In step 65 the upper 12 and lower 16 still cameras are activated in order to take photographs of the reference solid object to be modeled, respectively from above and from below, with a very weak, diffused light emitted by the light sources 32 and 34. In step 66 the lateral still camera 14 is activated in order to take a photograph around the reference solid object to be modeled, with a very weak, diffused light emitted by the light sources 32 and 34.

Subsequently, in step 67 the first light source 32 is switched on, and it emits a direct, intense white light, and another photograph is taken with the lateral still camera 14; then in step 68 the first light source 32 is switched off and the second light source 34 is switched on and emits a direct, intense white light, and another photograph is taken with the lateral still camera 14. Finally in step 69 the second light source 34 is switched off.

In step 70 the motor means 23 of the acquisition device 10, which are adapted to rotate the transparent rotating plate 22, are actuated until the next marker, be it primary 38 or secondary 40, is aligned with the sensor 36.

If in step 71 the sensor 36 detects the primary marker 38, ascertaining their mutual alignment and therefore the end of one complete rotation, then in step 74 the motor means 23 are switched off and operations are concluded.

Otherwise, in step 72 it is checked if the sensor 36 detects the secondary marker 40 of the transparent rotating plate 22, and therefore their mutual alignment. If the sensor 36 does not detect the secondary marker 40, the motor means 23 continue to be actuated, until a marker 38 or 40 is detected by the sensor 36. If on the other hand the sensor 36 detects the secondary marker 40, then in step 73 the motor means 23 are switched off and then the method returns to step 66 described above.

In detail, the step 51 of searching in the library 52 for a preexisting 3D model that is similar to the reference solid object to be modeled, and the subsequent step 53 of checking the outcome of such search, comprise the following substeps.

The elliptical blocks 80 and 81 respectively represent two photographic images AL (L: left) and AR (R: right) of the reference solid object to be modeled, which were previously acquired in an instance of step 66 by the lateral still camera 14, which as mentioned is stereoscopic.

In step 82, based on the two photographic images AL 80 and AR 81 of the reference solid object, the processing device 2, in particular the corresponding control unit 4, is configured to calculate the depth image of the reference solid object, using conventional techniques.

In step 84 the depth image that has just been calculated, together with the silhouette image of the reference solid object, are used by the processing device 2, in particular by the corresponding control unit 4, to execute the comparison (similar to the comparison commonly performed for recognition of human faces) with the depth images and silhouette images of the preexisting 3D models present in the library 52, such comparison being performed taking into consideration the similarity sensitivity threshold 83, preferably set by the user 8.

Finally, in step 85 the outcome of the comparison in step 84 between the acquired photographic images and the preexisting 3D models is returned, for example with a value of TRUE in the positive case, when there is a preexisting 3D model in the library 52 which is similar to the reference solid object within the sensitivity threshold, and FALSE in the negative case, when there is no preexisting 3D model in the library 52 which is similar to the reference solid object within the sensitivity threshold.

In an embodiment of the disclosure, the comparison operation, in order to be more reliable, can be carried out for all the pairs of photographs AL and AR that were taken around the reference solid object by the lateral still camera 14. Clearly, when using all 4 pairs of photographs AL 80 and AR 81 that were taken around the reference solid object, all 4 comparisons must return positive (TRUE) outcomes in order to be able to say that there is a preexisting 3D model in the library 52 which is similar to the reference solid object within the sensitivity threshold.

In detail, the step 55 of creating a new 3D model by way of adaptation of a preexisting 3D model identified in the library 52, and the subsequent step 56 of saving the new 3D model corresponding to the reference solid object, comprises the following substeps.

Once a preexisting 3D model similar to the reference solid object within the sensitivity threshold has been identified in the library 52, the processing device 2, in particular the corresponding control unit 4, is configured to generate the final texture atlas necessary to render the new 3D model corresponding to the reference solid object that is to be created.

The elliptical blocks 90 and 91 respectively represent two pairs of photographic images A0 and A1 of the reference solid object to be modeled, which were previously acquired respectively in an instance of step 67 and of step 68 by the lateral still camera 14, which as mentioned is stereoscopic.

In step 92, based on the two pairs of photographic images A0 90 and A1 91 of the reference solid object, the processing device 2, in particular the corresponding control unit 4, is configured to calculate the normal map by computing the pixel-by-pixel differential, the mask, and the specular map of the reference solid object, using conventional techniques. In particular, the normal map and the mask thus obtained make it possible to identify the material (characterized by roughness, opacity, transparency, and so on) from which the reference solid object is made.

Figure 9:
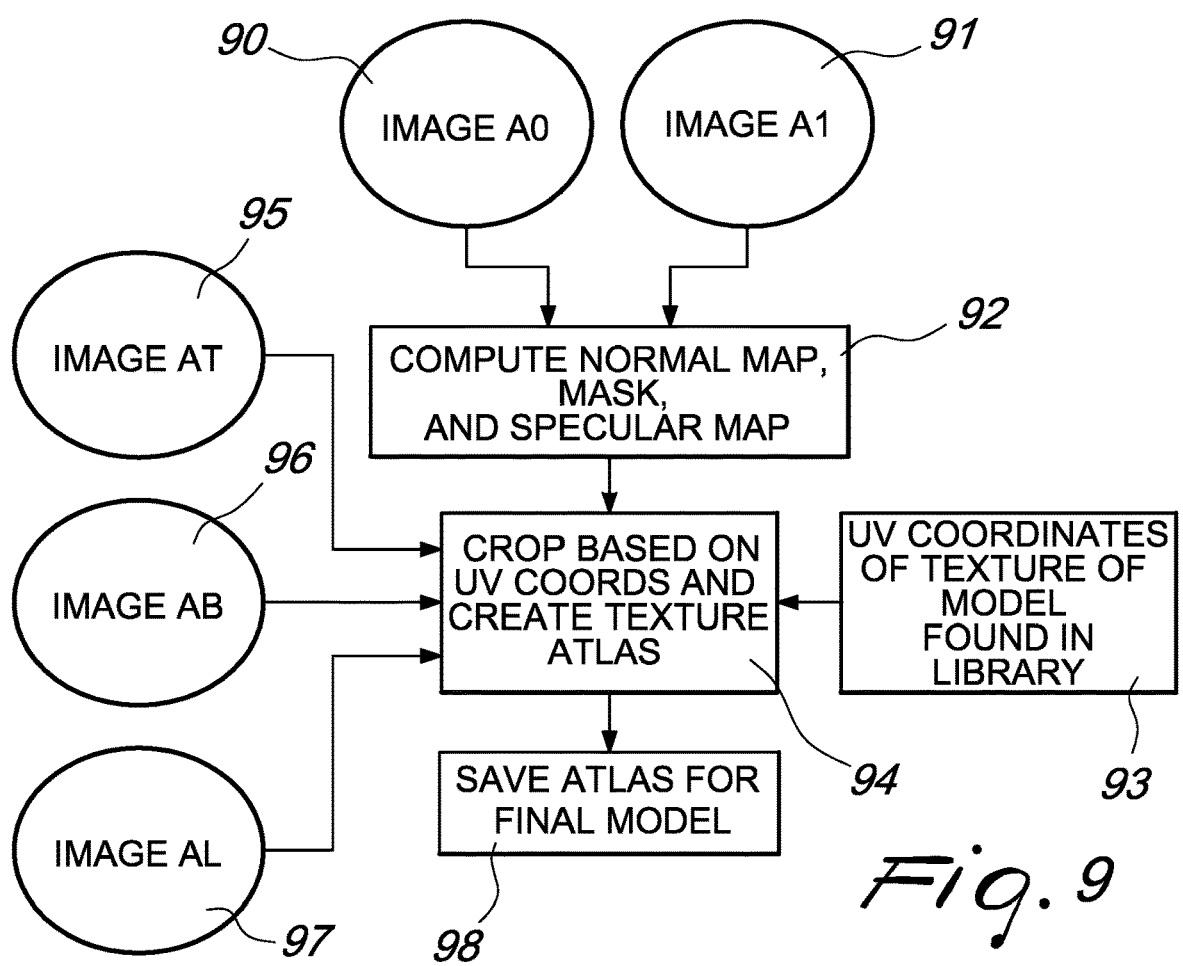
FIG. 9 is a flowchart illustrating in detail the step of creating a new 3D model by way of adaptation of a preexisting 3D model, of an embodiment of the method for creating three-dimensional models, according to the present disclosure.

The elliptical block 97 represents any one of two photographic images AL and AR (FIG. 9 shows the AL photograph, but the photograph AR can alternatively also be used) of the reference solid object to be modeled, which were previously acquired in an instance of step 66 by the lateral still camera 14, which as mentioned is stereoscopic.

The elliptical blocks 95 and 96 respectively represent two photographic images AT (T: top) and AB (B: bottom) of the reference solid object to be modeled, which were previously acquired in step 65 respectively by the upper still camera 12 and the lower still camera 16.

In step 94, based on the photographic images AT 95, AB 96 and AL (or AR) 97 of the reference solid object, the processing device 2, in particular the corresponding control unit 4, is configured to generate the texture atlas of albedo, normal map and mask, where the term "texture atlas" means a single big image containing a grouping, or atlas, of sub-images that correspond to image parts cropped from the various views of the reference solid object to be modeled, in this specific case such views being the photographic images AT 95, AB 96 and AL (or AR) 97. In particular, the operation of cropping parts of an image occurs by way of the UV coordinates 93 of the texture mapping of the preexisting 3D model found in the library 52.

Finally, in step 98 the new adapted 3D model corresponding to the reference solid object to be modeled is saved in the library 52, i.e. in the storage means 6 of 3D models, comprising the texture mapping UV coordinates that are adapted to the texture atlas generated in step 94.

In practice it has been found that the disclosure fully achieves the set aim and objects. In particular, it has been seen that the system and the method for creating three-dimensional models thus conceived makes it possible to overcome the qualitative limitations of the known art, since they make it possible to obtain levels of productivity that are superior to those that can be obtained with conventional solutions and/or levels of productivity that are similar but at lower cost, thus making it possible to reduce to the minimum the times and the costs sustained in order to obtain one or more 3D models.

Another advantage of the system and of the method for creating three-dimensional models according to the disclosure is that they make it possible to create 3D models that are suitable for rendering in real time, while retaining a high graphical quality and a high level of detail.

Another advantage of the system and of the method for creating three-dimensional models according to the disclosure is that they make it possible to create 3D models that are already cleaned up and reduced in terms of number of points and in which artifacts have already been corrected, and which are therefore suitable for rendering in real time.

In synthesis, in order to obtain the above advantages, the system and the method for creating three-dimensional models according to the disclosure avail of a library of preexisting three-dimensional models, which are created using any 3D modeling application software by an expert graphics technician.

By way of acquiring photographic images, the system recognizes the preexisting 3D model in the library that is closest to the real solid object photographed and based on that it generates a new 3D model, re-adapted in terms of scaling and texture.

Although the system and the method for creating three-dimensional models according to the disclosure have been conceived in particular for the automatic scanning of real solid objects and the subsequent creation of corresponding 3D models for use in real-time, three-dimensional videogaming software applications, they can also be used, more generally, for the automatic scanning of solid objects and the subsequent creation of corresponding 3D models for use in any application software that uses three-dimensional computer graphics.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102016000091510 from which this application claims priority are incorporated herein by reference.

The invention claimed is:

1. A system for creating three-dimensional models, which comprises a processing device operated by a user, comprising a control unit, storage means for storing photographic images, and storage means for storing 3D models, further comprising an acquisition device for acquiring photographic images of a reference solid object, said processing device and said acquisition device being mutually connected and in communication, and wherein said processing device is configured to create a 3D model that corresponds to said reference solid object based on said photographic images of said reference solid object acquired by said acquisition device and saved in said photographic image storage means, wherein said processing device is further configured to search, in said 3D model storage means, for a preexisting 3D model that is similar to said reference solid object within a similarity sensitivity threshold, based on said photographic images of said reference solid object, wherein said processing device is further configured to create a 3D model that corresponds to said reference solid object by adaptation, in terms of depth image and a silhouette image, of said reference solid object with depth images and silhouette images of preexisting 3D models in said library, taking into account a similarity sensitivity threshold, using said preexisting 3D model as an initial 3D model.

2. The system for creating three-dimensional models according to claim 1, wherein said processing device is further configured to save said 3D model that corresponds to said reference solid object in said 3D model storage means.

3. A method for creating three-dimensional models including the following steps:
   acquiring photographic images of a reference solid object by way of a photographic image acquisition device;
   transmitting said photographic images of said reference solid object from said acquisition device to a processing device;
   searching in a library for a preexisting 3D model that is similar to said reference solid object within a similarity sensitivity threshold, based on said photographic images of said reference solid object, by way of said processing device;
   creating a 3D model that corresponds to said reference solid object by adaptation, using said preexisting 3D model as an initial 3D model, by way of said processing device; and
   saving said 3D model that corresponds to said reference solid object in said library, by way of said processing device, wherein said step of searching for said preexisting 3D model that is similar to said reference solid object includes the following steps:
   calculating a depth image of said reference solid object, based on two photographic images AL and AR of said reference solid object;
   comparing said depth image and a silhouette image of said reference solid object with depth images and silhouette images of preexisting 3D models in said library, taking into account a similarity sensitivity threshold; and
   returning an outcome of said comparison step.

4. The method for creating three-dimensional models according to claim 3, wherein said step of creating and saving said 3D model that corresponds to said reference solid object includes the following steps:

calculating a normal map by computing the pixel-by-pixel differential, a mask, and a specular map of said reference solid object, based on two pairs of photographic images AO and AI of said reference solid object wherein said photographic images comprise AT, AB, AL and AR photographic images;

generating a texture atlas of albedo, normal map and mask, based on photographic images AT, AB, AL and AR of said reference solid object, cropping parts of said photographic images AT, AB, AL and AR of said reference solid object by way of UV coordinates of the texture mapping of said preexisting 3D model that is similar to said reference solid object and has been identified in said library; and saving said 3D model that corresponds to said reference solid object in said library, comprising texture mapping UV coordinates that are adapted to the texture atlas generated in said step.

* * * * *